(12) United States Patent
Wang

(10) Patent No.: US 9,747,215 B2
(45) Date of Patent: Aug. 29, 2017

(54) STRIDE REFERENCE PREFETCHER

(71) Applicant: VIA ALLIANCE SEMICONDUCTOR CO., LTD., Shanghai (CN)

(72) Inventor: Jiajun Wang, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 35 days.

(21) Appl. No.: 15/003,050

(22) Filed: Jan. 21, 2016

(65) Prior Publication Data

US 2017/0168946 A1    Jun. 15, 2017

Related U.S. Application Data

(60) Provisional application No. 62/266,855, filed on Dec. 14, 2015.

(51) Int. Cl.
*G06F 12/08*    (2016.01)
*G06F 12/0862*  (2016.01)

(52) U.S. Cl.
CPC .. *G06F 12/0862* (2013.01); *G06F 2212/6024* (2013.01)

(58) Field of Classification Search
CPC .................................................. G06F 12/0862
USPC ....................................................... 711/137
See application file for complete search history.

(56) References Cited

U.S. PATENT DOCUMENTS

| 7,404,024 | B2 * | 7/2008 | Ries ..................... G06F 13/364 710/107 |
| 9,430,392 | B2 * | 8/2016 | Jain ..................... G06F 12/0862 |
| 2013/0013867 | A1 * | 1/2013 | Manne ................ G06F 12/0862 711/137 |
| 2016/0054997 | A1 * | 2/2016 | Radhakrishnan ... G06F 12/0862 711/137 |

(Continued)

OTHER PUBLICATIONS

Ishii, Yasuo et al. "Access Map Pattern Matching for High Performance Data Cache Prefetch." *Journal of Instruction—Level Parallelism*, vol. 13, Jan. 2011, pp. 1-24.

(Continued)

*Primary Examiner* — Pierre-Michel Bataille
(74) *Attorney, Agent, or Firm* — Gary Stanford; James W. Huffman

(57) ABSTRACT

A processor including a cache memory, processing logic, access logic, stride mask logic, count logic, arbitration logic, and a prefetcher. The processing logic submits load requests to access cache lines of a memory page. The access logic updates an access vector for the memory page, in which the access logic determines a minimum stride value between successive load requests. The stride mask logic provides a mask vector based on the minimum stride value. The count logic combines the mask vector with the access vector to provide an access count. The arbitration logic triggers a prefetch operation when the access count achieves a predetermined count threshold. The prefetcher performs the prefetch operation using a prefetch address determined by combining the minimum stride value with an address of a last one of the load requests. Direction of the stride may be determined, and a stable mode is described.

31 Claims, 6 Drawing Sheets

(56) References Cited

U.S. PATENT DOCUMENTS

2016/0357677 A1* 12/2016 Hooker .............. G06F 12/0862

OTHER PUBLICATIONS

Pugsley, Seth K. et al. "Sandbox Prefetching: Safe Run-Time Evaluation of Aggressive Prefetchers." 2014 IEEE 20$^{th}$ International Symposium on High Performance Computer Architecture. pp. 1-12.

* cited by examiner

| PPA | STABLE | STRIDE | SIGN | POS | NEG | PREVIOUS ACCESS | ACCESS HISTORY |
|---|---|---|---|---|---|---|---|
LOAD ACCESS 0X4000; INITIAL ACCESS OF PAGE 0X4   — 1002
| 0X4 | 0 | 1111 | 0 | 0000 | 0000 | 000000 | 00... ...0000001 |
LOAD ACCESS 0X4100; UPDATE ENTRY FOR PAGE 0X4:   — 1004
| 0X4 | 0 | 0100 | 0 | 0000 | 0000 | 000100 | 00... ...0010001 |
LOAD ACCESS 0X4080; UPDATE ENTRY FOR PAGE 0X4:   — 1006
| 0X4 | 0 | 0010 | 0 | 0000 | 0000 | 000010 | 00... ...0010101 |
*FIG. 10*
*FIG. 11*
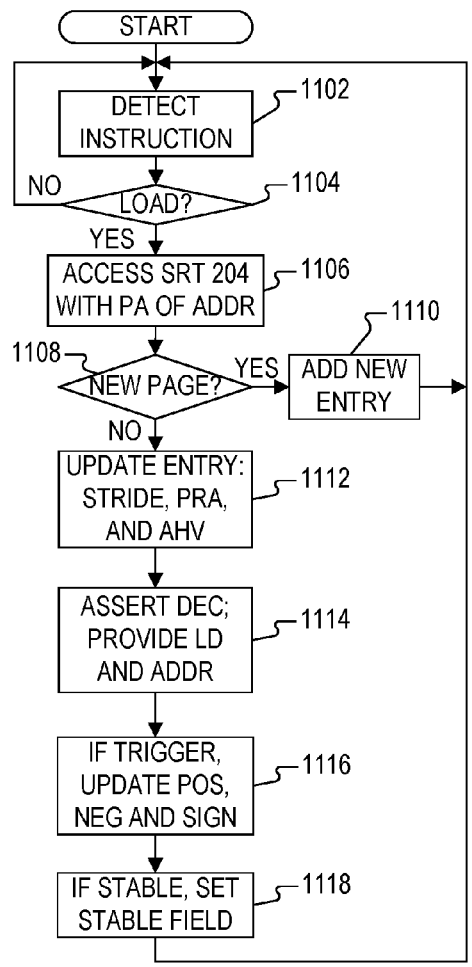
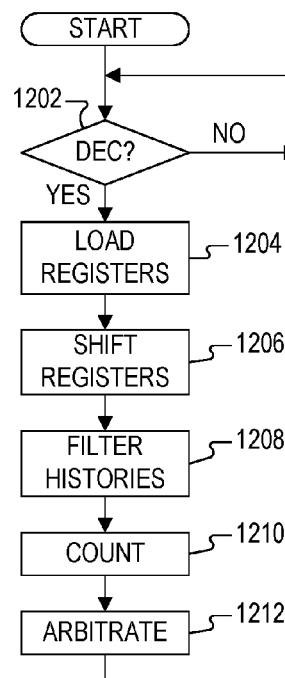
*FIG. 12*
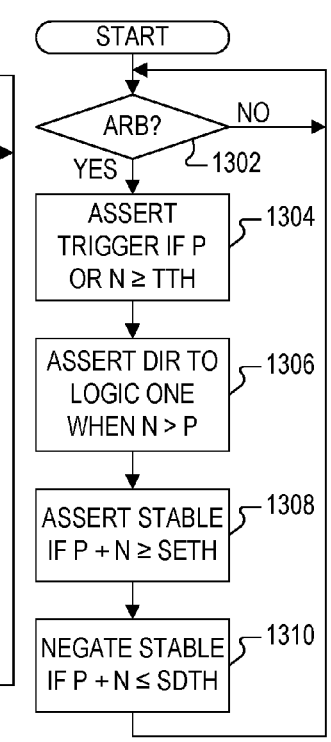
*FIG. 13*

STRIDE REFERENCE PREFETCHER

CROSS-REFERENCE TO RELATED APPLICATIONS

This application claims the benefit of U.S. Provisional Application Ser. No. 62/266,855, filed on Dec. 14, 2015, which is hereby incorporated by reference in its entirety for all intents and purposes.

BACKGROUND OF THE INVENTION

Field of the Invention

The present invention relates in general to prefetching information into a cache memory, and more particularly to a stride reference prefetcher that determines a minimum stride value and stride direction between successive load accesses for identifying at least one prefetch address.

Description of the Related Art

Memory access latency is a significant factor in reducing processing performance and efficiency. Processing circuitry is often separated from a primary memory through multiple layers of circuitry and associated access protocols. For example, a processor may be coupled to an external system memory that stores information needed by the processor, such as instructions and data and other information to be processed by a computer system. Access to the external system memory may be relatively slow since the information must often traverse multiple levels of circuitry, such as a bus interface unit and/or a memory controller and the like, and the external devices often operate with a slower system clock. A processor typically incorporates at least one level of cache memory that locally stores information retrieved from the external system memory for faster access by processing circuitry within the processor. Access to an internal cache is substantially faster since the cache is physically closer, has fewer intermediate circuitry levels, and often operates at a faster clock speed.

Prefetching is a commonly used technique in which blocks of information are retrieved from the primary memory in advance and stored into a local cache for faster access by the processing circuitry when needed. Although the cache memory may be significantly faster, performance and efficiency are improved only when the cache retrieves the information that is subsequently requested by the processing circuitry in a timely fashion. A prefetching algorithm that does not retrieve the target information or otherwise retrieves too much of the wrong information may not appreciably increase and may even reduce overall performance and efficiency.

SUMMARY OF THE INVENTION

A stride reference prefetcher for a processor according to one embodiment includes access logic, stride mask logic, count logic, arbitration logic, and a prefetcher. The access logic detects successive load requests to cache lines of a page of memory, determines a stride value between each of the successive load requests, determines a minimum stride value, and updates an access history vector which identifies each cache line of the page of memory that has been accessed. The stride mask logic provides a stride mask vector based on the minimum stride value. The count logic that filters the access history vector with the stride mask vector to determine a positive access count and a negative access count. The arbitration logic triggers a prefetch operation when either one of the positive access count and the negative access count meets a trigger threshold. The arbitration logic also indicates a direction of memory accesses based on a relative size of the positive access count and the negative access count. The prefetcher performs the prefetch operation using a prefetch address when triggered by the arbitration logic. The prefetcher determines the prefetch address by combining a load request address and the minimum stride value in a direction indicated by the arbitration logic.

A processor according to one embodiment includes a cache memory, processing logic, access logic, stride mask logic, count logic, arbitration logic, and a prefetcher. The processing logic submits load requests to access cache lines of a memory page. The access logic receives the load requests and updates an access vector for the memory page, in which the access logic determines a minimum stride value between successive load requests. The stride mask logic provides a mask vector based on the minimum stride value. The count logic combines the mask vector with the access vector to provide an access count. The arbitration logic triggers a prefetch operation when the access count achieves a predetermined count threshold. The prefetcher performs the prefetch operation using a prefetch address determined by combining the minimum stride value with an address of a last one of the load requests.

The access logic may include a reference table that stores a page address of the page, the minimum stride value, a previous access value that identifies a cache line accessed by the load request address, and the access history vector. The access logic may include adders, comparators, decoders, and other logic to determine each stride value, for determining and updating the minimum stride value between successive load request accesses, and for updating the access history vector. The access history vector may comprise multiple bits, each corresponding with a cache line of a page of memory. The count logic may include shift registers or the like to distinguish between positive and negative directions, and Boolean logic or the like for combining positive and negative access history values with the stride mask vector to determine the positive and negative access counts. The arbitration logic includes adders and comparators or the like to determine whether the trigger threshold is met and the direction of the stride. The arbitration logic may also determine a stable mode of operation if a sum of the positive and negative access counts achieves a stable enable threshold. In the stable mode of operation, the prefetcher adds the minimum stride value a number of times to perform successive prefetch operations, while not getting too far ahead of actual load accesses. The arbitration logic may also terminate the stable mode of operation if the sum of the positive and negative access counts falls to a stable disable threshold.

A method of prefetching data from a memory into a processor according to one embodiment includes detecting successive load requests to cache lines of a page of memory, determining a stride value between each of the successive load requests, determining a minimum stride value, updating an access history vector that identifies each cache line of the page of memory that has been accessed determining a stride mask vector based on the minimum stride value, filtering the access history vector with the stride mask vector and determining an access count and performing a prefetch operation when the access count achieves a predetermined count threshold.

The method may include updating a stored previous access value for each successive load request, and comparing a next access value with the stored previous access value. The method may include determining a stride value for each successive load request, comparing a next stride value with a currently stored minimum stride value, and updating the minimum stride value with the next stride value if the next stride value is less than the currently stored minimum stride value. The method may include selecting one of multiple stride mask vectors, each corresponding with a corresponding one of multiple possible stride values.

The method may also include shifting the access history vector in a first direction to provide a positive access history vector, shifting the access history vector in a second, opposite direction to provide a negative access history vector, filtering the positive access history vector with the stride mask vector to provide a positive count, filtering the negative access history vector with the stride mask vector to provide a negative count, performing the prefetch operation when either one of the positive and negative counts achieves the predetermined count threshold, and determining a direction of the prefetch operation based on comparing the positive and negative counts. The method may include adding the positive and negative counts to determine a sum count, comparing the sum count with a stable enable threshold, and operating in a stable mode when the sum count reaches the stable enable threshold. The method may include repeatedly adding the minimum stride value to determine successive prefetch addresses and performing a prefetch operation for each of the successive prefetch addresses. The method may include comparing the sum count with a stable disable threshold, and terminating the stable mode of operation when the sum count falls to the stable disable threshold.

BRIEF DESCRIPTION OF THE DRAWINGS

The benefits, features, and advantages of the present invention will become better understood with regard to the following description, and accompanying drawings where:

FIG. 10 is a diagram of one entry of a given row in the stride reference table of FIG. 3 illustrating how the fields are updated for a given series of accesses to the same page;

FIG. 11 is a flowchart diagram illustrating operation of the update logic of FIG. 2 according to one embodiment;

FIG. 12 is a flowchart diagram illustrating operation of the control logic of FIG. 3 according to one embodiment;

FIG. 13 is a flowchart diagram illustrating operation of the arbitration logic of FIG. 3 according to one embodiment.

DETAILED DESCRIPTION

The inventor has recognized the need for a more efficient and accurate memory prefetcher for a processor. She has therefore developed a stride reference prefetcher that identifies a minimum stride value and stride direction between successive load accesses for identifying at least one prefetch address. A stride reference implementation of a memory prefetcher as described herein holds particular advantage for use in an out-of-order processor in which load instructions may be presented to the memory unit in a different order than that prescribed in the original application or software program.

The term "processor" as used herein refers to any type of processing unit, including a microprocessor, a central processing unit (CPU), a processing core, a microcontroller, etc. The term "processor" as used herein also includes any type of processor configuration, such as processing units integrated on a chip or integrated circuit (IC) including those incorporated within a system of a chip (SOC) or the like. It is advantageous for processing logic of the processor to operate out of an internal cache to the extent possible.

Figure 1:
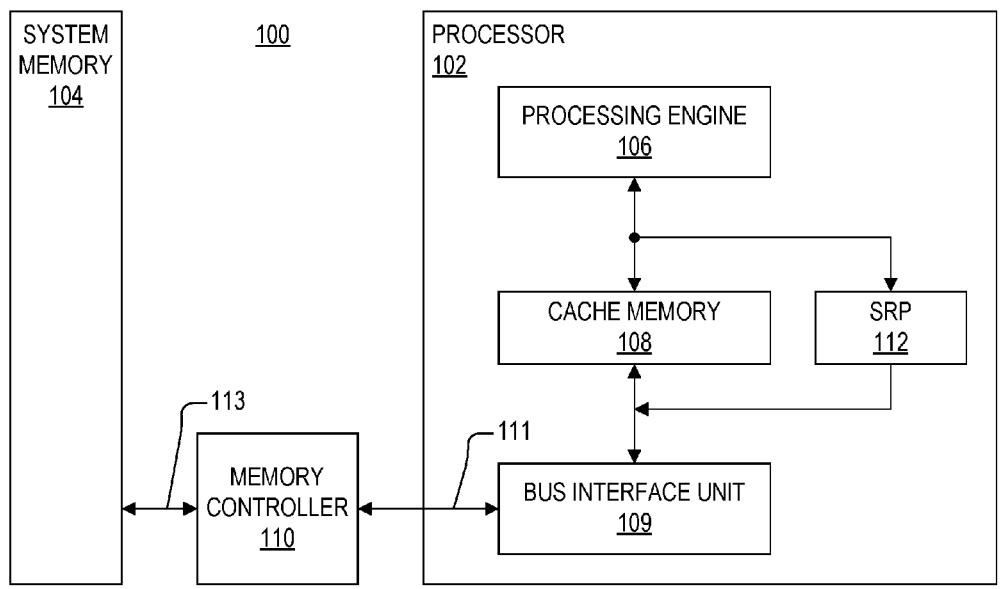
FIG. 1 is a simplified block diagram of a processing system including a processor incorporating a stride reference prefetcher implemented according to one embodiment.

FIG. 1 is a simplified block diagram of a processing system 100 including a processor 102 incorporating a stride reference prefetcher (SRP) 112 implemented according to one embodiment. The processor 102 is coupled to an external system memory 104 that stores instructions and data for consumption by the processor 102. The processor 102 includes a processing engine 106, a cache memory 108, and a bus interface unit 109 that communicates with an external memory controller 110 for interfacing the system memory 104 via one or more busses 111 and 113 or the like. The memory controller 110 may be incorporated on the processor 102 in alternative configurations. The processing engine 106 may be configured in any suitable manner for executing software programs or applications and the like. For example, the standard instruction set architecture (ISA) of the processor 102 may be an x86 macroarchitecture in which it can correctly execute a majority of the application programs that are designed to be executed on an x86 processor. An application program is correctly executed if its expected results are obtained. The present invention is not limited to x86 architectures, however, in which the processor 102 may be according to any alternative ISA as known by those of ordinary skill in the art. The processing engine executes instructions of the selected ISA, referred to as the macroinstructions, and the processing engine 106 includes the associated user-visible register set.

Although not shown, the processing engine 106 may include a fetch unit that retrieves macroinstructions into an instruction cache, a translator that converts the macroinstructions into corresponding microinstructions or "micro-ops" of the native instruction set of the processor 102, a scheduler or the like that schedules execution of the microinstructions, and one or more execution units for executing the microinstructions. The processor 102 may be an out-of-order processor in which the macroinstructions or microinstructions (hereinafter, simply "instructions") may be executed out of the original program order in order to improve performance as long as the same results are ultimately achieved. The execution units may include one or more integer execution units, one or more floating point (FP) or media execution units, a memory subsystem including one or more load pipelines and one or more store pipelines, etc. A unit such as a reorder buffer (ROB), a physical register renaming unit, or a related hardware structure may be included to ensure that the instructions are retired in program order to achieve proper operation according to the original program instructions.

The cache memory 108 incorporates or otherwise represents either the instruction cache (or "icache"), a data cache (or "dcache"), or a combination of different cache types. An instruction cache may store the macroinstructions retrieved from an application stored in the system memory 104. The cache memory 108 also represents one or more cache levels that may be incorporated on the processor 102. For example, the cache memory 108 may include a smaller, faster level-1 (L1) cache, a larger level-2 (L2) cache, and possibly additional cache levels depending upon the particular configuration. The L1 cache may be incorporated within the memory subsystem of the processing engine 106. In one embodiment, the cache memory 108 includes at least the L2 data cache of the processor 102.

In operation, the processing engine 106 executes instructions including operands or the like that reference data values ultimately located in the system memory 104. In one embodiment, the microinstructions include load instructions that are submitted to the cache memory 108 with a corresponding address to access the requested data stored at the addressed location. Many different types of load instructions may be defined, but each is simply referred to herein as a load instruction. If the requested data is stored within the cache memory 108, then the data is retrieved from the cache memory 108 and provided to the processing engine 106 without having to access the system memory 104. Access to the cache memory 108 is substantially faster than access to the system memory 104 thereby improving performance. If, however, the requested data is not stored within the cache memory 108, then the cache memory 108 forwards the request to any additional cache levels (not shown) and/or to the memory controller 110 via the bus interface unit 109. The memory controller 110 retrieves the requested data from the system memory 104 and forwards the requested data to the cache memory 108 for storage. Once stored in the cache memory 108, the data is available to the processing engine 106 in response to the load instruction. Storing data into the system memory 104, such as by executing store instructions, operates in the reverse direction, but is not further described herein.

It is appreciated that the cache memory 108 improves performance and efficiency to the extent that it stores data when needed by the processing engine 106. The SRP 112 operates to detect the load instructions from the processing engine 106 and to then anticipate future load requests by the processing engine 106. The anticipated data is prefetched into the cache memory 108 before actually requested by the processing engine 106. If the SRP 112 correctly anticipates future load instructions, then performance is significantly improved.

Figure 2:
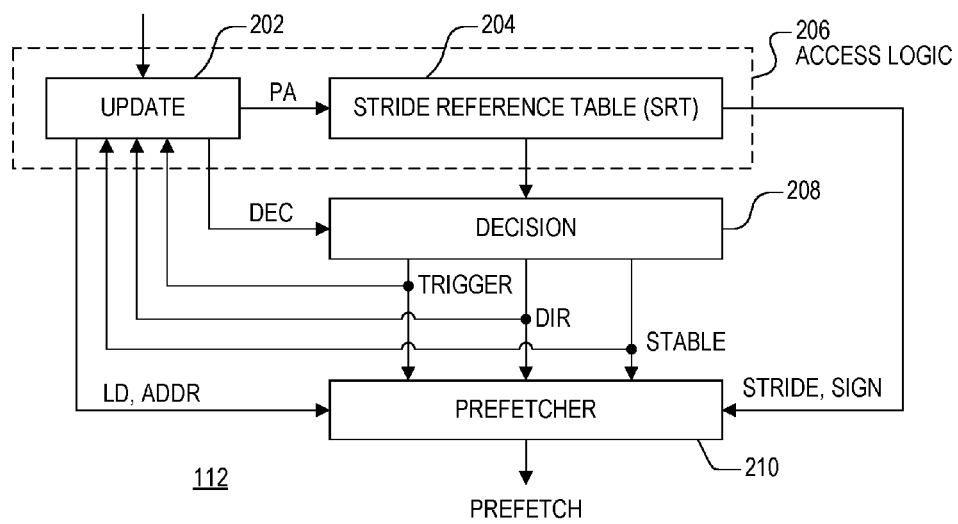
FIG. 2 is a simplified block diagram of the of FIG. 1 according to one embodiment.

FIG. 2 is a simplified block diagram of the SRP 112 according to one embodiment. Each load instruction from the processing engine 106 is detected by update logic 202 of access logic 206 of the SRP 112. Each load instruction includes a corresponding address ADDR, which may be a full (or complete) address as further described herein, in which an upper portion of the ADDR is a page address PA. The update logic 202 accesses and updates a stride reference table (SRT) 204 of the access logic 206 using the page address PA. If the page address PA is not found in the SRT 204, then the SRT 204 is updated with the new entry for the corresponding page and operation is completed. If the page address PA is found in the SRT 204, then the corresponding page entry is first updated, and the update logic 202 then asserts a decision signal DEC to decision logic 208, which accesses information from the corresponding entry addressed by PA (provided by the update logic 202) in the SRT 204 to make a prefetch decision. If a decision is made to perform a prefetch operation, then the decision logic 208 asserts a signal TRIGGER to a prefetcher 210, and also asserts a direction signal DIR. The update logic 202 also indicates each load instruction occurrence with a load signal LD, and provides the address ADDR of the current load instruction to the prefetcher 210. The prefetcher 210 uses ADDR to determine a prefetch address for each of one or more prefetch operations as further described herein. The decision logic 208 also reads a STRIDE value, which is either added to, or subtracted from, the ADDR to determine the prefetch address. The DIR signal indicates whether the STRIDE value is added or subtracted.

In one embodiment, the DIR signal is a binary type signal or the like that indicates either a positive or a negative direction. In one embodiment, the positive direction indicates increasing memory addresses, in which the STRIDE value is added to ADDR, whereas a negative direction indicates decreasing memory addresses, in which the STRIDE value is subtracted from the ADDR. In this manner, the STRIDE value indicates a relative offset between successive load accesses and the DIR signal indicates whether the successive accesses are moving up or down in the memory. The DIR signal is provided back to the update logic 202, which updates the corresponding entry in the SRT 204 when TRIGGER is also asserted as further described herein.

When the decision logic 208 detects a significant number of successive load accesses using STRIDE in a direction indicated by a value SIGN from the SRT 204, it asserts a signal STABLE to the prefetcher 210. While STABLE is asserted by the decision logic 208, the prefetcher 210 performs multiple successive prefetch operations using the STRIDE and SIGN values. If SIGN indicates a positive direction, then STRIDE is added multiple times to the current load address to determine multiple prefetch addresses in the positive direction. Otherwise, if SIGN indicates a negative direction, then STRIDE is subtracted multiple times from the current load address to determine multiple prefetch addresses in the negative direction. The stable mode of operation continues until the STABLE signal is no longer asserted, in which case operation returns to the normal trigger mode indicated by assertions of the TRIGGER signal. It is noted that during the stable mode of operation, the access logic 206 and the decision logic 208 continue to operate as normal even though the prefetcher 210 may ignore assertions of the TRIGGER signal.

Figure 3:
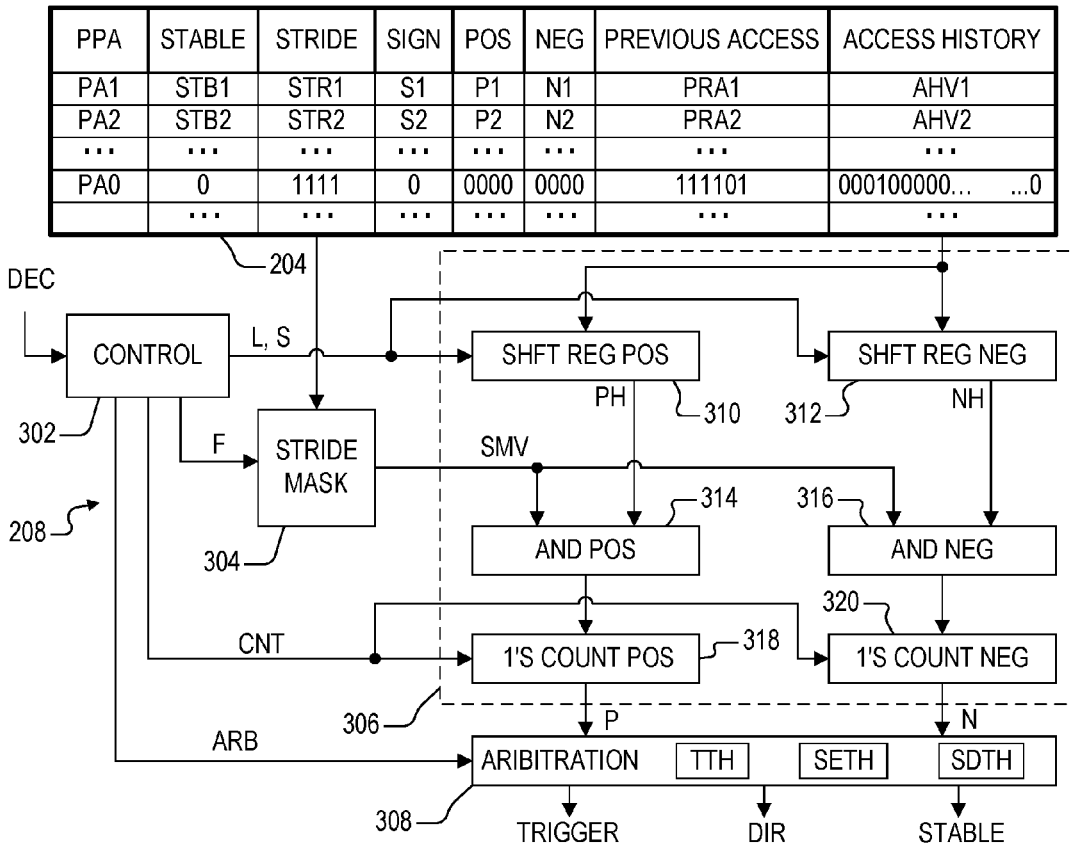
FIG. 3 is a more detailed block diagram of the stride reference table and the decision logic of FIG. 2 according to one embodiment.

FIG. 3 is a more detailed block diagram of the SRT 204 and the decision logic 208 according to one embodiment. The SRT 204 may be either fully associative or set associative. The illustrated SRT 204 includes eight fields (columns) for each of multiple rows of entries, each entry storing corresponding values associated with a page of the memory 104. The fields include a physical page address (PPA) field, a stable field (STABLE), a stride field (STRIDE) indicating a minimum offset between successive memory accesses, a sign field (SIGN) indicating a memory access direction during the stable mode, a positive field (POS) providing a count in the positive direction, a negative field (NEG) providing a count in the positive direction, a previous access field (PREVIOUS ACCESS) providing a partial address indicating a last cache line that was accessed, and an access history field (ACCESS HISTORY) indicating which cache lines of the page have been accessed over time. When a physical page in the system memory 104 is accessed for the first time, a new page entry is allocated for the page to track additional accesses to the page. If the SRT 204 is not full, then the next available unused row is allocated and initialized with initial values. If the SRT 204 is full, then one of the current entries is selected as a victim which is replaced by a new entry with the new page address, and each of the fields in that entry row are replaced with the initial values. The victim being replaced in the SRT 204 is selected according to any suitable replacement policy, such as, for example, a least recently used (LRU) replacement policy.

The PPA field stores the upper bits of the page address (shown as PA1, PA2, etc.) sufficient to uniquely identify the page. As further described herein, each page of the memory 104 is subdivided into cache lines (or blocks), and each cache line stores a plurality of bytes of data. The stable field stores at least one bit (shown as STB1, STB2, etc.) that is set true (e.g., logic "1") when the STABLE signal is asserted indicating the stable mode of operation has been invoked for that page. The stride field stores an unsigned value (shown as STR1, STR2, etc.) having a cache line granularity that indicates a cache line offset relative to a current page address indicative of a memory access pattern, such as when the load accesses are every cache line, every other cache line, every third cache line, etc. The POS and NEG fields store positive and negative count values (shown as P1, P2, etc., and N1, N2, etc., respectively), indicating a prevalent direction of a memory access pattern, such as in the positive direction (increasing memory addresses) or the negative direction (decreasing memory addresses). The SIGN field may be a single bit (shown as S1, S2, etc.) that identifies the larger one of the corresponding POS and NEG fields for the page. In the event that POS and NEG are equal, then the sign value indicates the positive direction (in which the positive direction is more common and thus is considered dominant over the negative direction). The previous access field stores a value (shown as PRA1, PRA2, etc.) having a cache line granularity and identifies the particular cache line within the page of the last page access. The access history field stores an access history vector (AHV) (individually shown as AHV1, AHV2, etc.) having a number of bits equal to the number of cache lines of a page of memory, and is used to keep track of cache line accesses within the page.

The size of each field depends upon the physical page size and the cache line (or block) size. In one embodiment, the system memory 104 may have a page size of 4 Kilobytes (KB, or 4,096 bytes), a cache line size of 64 bytes (B), and a physical address of 48 bits, or ADDR[47:0]. In this case, PPA is 36 bits, or ADDR[47:12] (being the upper 36 bits of the page address uniquely identifying each physical page), the previous access field is 6 bits, or ADDR[11:6] (sufficient to uniquely identify each of 64 cache lines within a given page), and the access history field is 64 bits including 1 bit per cache line. Although the stride field may be 6 bits, it is chosen to have 4 bits instead to limit the largest stride to be detected to 15. In one embodiment, if the stride is larger than 15, then the prefetching address may be across the page boundary by the time the stride is detected. The present configuration is used to detect strides within a page rather than those that cross page boundaries. The POS and NEG fields are also 4 bits each. The stable and sign fields are 1 bit each. It is appreciated that the fields may have different sizes for different configurations, particularly for different page address lengths, page sizes, and cache line sizes.

An entry with PPA=PA0 illustrates the initial values for when a page with the page address PA0 is accessed for the first time. The initial stable value is 0b (in which a "b" appended at the end denotes a binary value) indicating that the stable mode of operation is initially false. The initial stride value is 1111b, which is the largest possible stride for a 4 bit value. A new stride value is determined for each additional access to the same page, and if the new stride value is less than the previous stride value, then the stride value is updated with the lower stride value. In this manner, the SRT 204 keeps track of the minimum stride for each page, which is the most likely to be the actual stride value. In an out-of-order processor, load accesses may be executed out of order obscuring the actual stride value. Nonetheless, it is determined that the genuine or actual stride will not be larger than any individual stride value for any particular load access. In this manner, the minimum stride offset is stored as the stride value for each page. The POS and NEG count values are each initially set to 0000b, and the sign bit is 0b initially indicating a positive direction.

The initial access history vector AHV has one of its 64 bits set to 1 indicating which cache line was hit by the current load access. In the illustrated embodiment, the $61^{st}$ bit is set to logic "1" and each of the remaining bits is set to logic "0" since only one access has been made so far. The previous access value is 111101b which is equal to the decimal number 61 in binary format. As described further herein, several of the values for the PF0 entry change with each new access. Suppose, for example, that the next load access is to the $59^{th}$ cache line of page 0. The new stride value is calculated as the difference in terms of numbers of cache lines, which is 2 (61−59=2). The STRIDE field for page PF0 is updated to 0010b indicating a stride of 2. The previous access field is changed to 111011b denoting that cache line 59 of the page PF0 was last accessed, and the access history vector is updated to 00010100 . . . 0b since now both the $61^{st}$ and $59^{th}$ cache lines have been accessed. Operation continues in this manner for each new load access to page PF0, except that the other fields are updated as further described herein.

The decision logic 208 includes control logic 302, stride mask logic 304, count logic 306 and arbitration logic 308. The control logic 302 generally controls timing and initiation of the other logic blocks in the decision logic 208. The count logic 306 includes a positive shift register 310 and a negative shift register 312, positive and negative logic AND logic 314 and 316, and positive and negative 1's count logic 318 and 320, respectively. As previously described, in response to a new load request, the update logic 202 updates the entry in the SRT 204 using the page address PA retrieved from the physical page address ADDR of the page being accessed, and then asserts the DEC signal to initiate a decision. The control logic 302 detects the DEC signal asserted, accesses the fields of the entry of the SRT 204 that correspond to the PA, and then asserts load (L) and shift (S) indications to the shift registers 310 and 312. The shift registers 310 and 312 load the corresponding AHV vector from the SRT 204, and then shift the loaded value by an amount based on the accessed cache line as further described herein. The positive shift register 310 shifts the loaded AHV in one direction corresponding to the positive direction and outputs a positive access history value (PH), and the negative shift register 312 shifts the loaded AHV in the opposite direction corresponding to the negative direction and outputs a negative access history value (NH). The number of shifts in each case depends on the position of the currently accessed cache line as further described herein. The PH value is provided to corresponding inputs of the positive AND logic 314, and the NH value is provided to corresponding inputs of the negative AND logic 316.

The control block 302 asserts a filter indication F to the stride mask logic 304, which accesses the stride value from the SRT 204 that corresponds with the page address PA, and generates or otherwise provides or selects a corresponding a stride mask vector (SMV) to corresponding inputs of the positive and negative logic AND logic 314 and 316. The positive and negative logic AND logic 314 and 316 each perform a bit-wise BOOLEAN AND logic function between the history values PH and NH and the SMV and outputs the results to corresponding inputs of the positive and negative 1's count logic 318 and 320, respectively. The positive 1's count logic 318 counts the number of logic "1's" provided at the output of the positive AND logic 314 and outputs a positive count P, and the negative 1's count logic 320 counts the number of logic "0's" provided at the output of the negative AND logic 316 and outputs a negative count N.

The control block 302 then asserts an arbitration indication ARB to the arbitration logic 308. The arbitration logic 308 includes or otherwise accesses several threshold values TTH, SETH and SDTH to control stride determination operation. Any one or more of the threshold values may be fixed or programmable. In one embodiment, each threshold value has a default value provided during the boot sequence that can be subsequently changed by the processor 102 via internal configuration registers or the like. When programmable, the threshold value may be programmed by a user. TTH is a trigger threshold for the P and N counts that determines when the TRIGGER signal is to be asserted. When prompted by the control logic 302, if either P or N achieves TTH, then the arbitration logic 308 asserts the TRIGGER signal. The DIR signal is asserted along with TRIGGER to indicate the direction of the detected stride, and is based on the larger one of the P and N count values. If P=N, then the direction is determined as positive since positive strides are determined to be more common and are thus dominant. Thus, if P≥N, then DIR is "0" indicating the positive direction, and otherwise when N>P, DIR is "1" indicating the negative direction. SETH is a stable enable threshold that determines when the stable mode of operation is enabled. When P+N≥SETH, then the arbitration logic 308 asserts the STABLE signal to initiate the stable mode of operation. SDTH is a stable disable threshold that determines when the stable mode of operation is disabled to return to normal trigger operation. When P+N≤SDTH, then the arbitration logic 308 de-asserts or negates the STABLE signal to terminate the stable mode of operation.

In one embodiment, TTH has a relatively low default value, such as 2, in which TRIGGER is asserted when either P or N reaches TTH. In one embodiment, SETH has a default value of 7, such that STABLE is asserted when P+N≥7. In one embodiment, SDTH has a default value of 4, such that STABLE is de-asserted during the stable mode of operation when P+N≤4. As noted above, however, the default values may be revised to different default values, and different threshold values may be programmed for different configurations.

Figure 4:
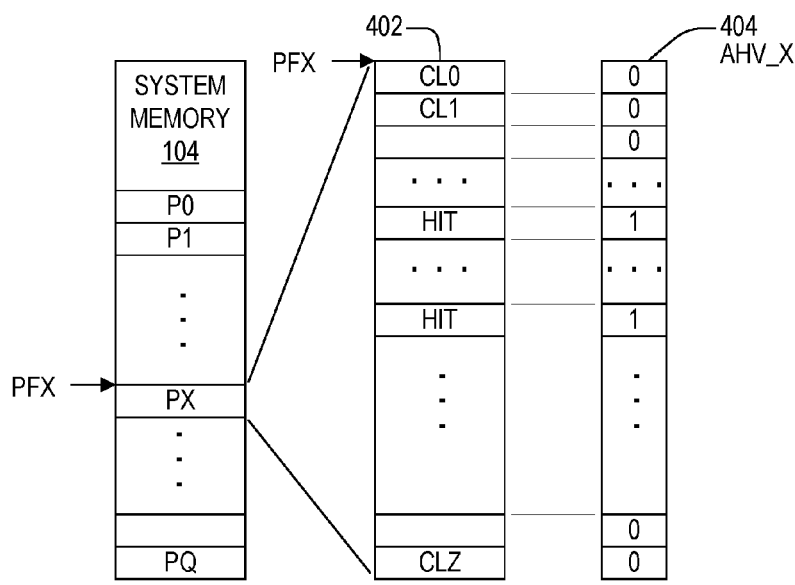
FIG. 4 is a simplified block diagram illustrating a form of the access history vector AHV according to one embodiment.

FIG. 4 is a simplified block diagram illustrating a form of the access history vector AHV according to one embodiment. The system memory 104 is divided into a series of Q+1 pages P0-PQ, in which Q is any suitable positive integer. The number of pages and the size of each page depends on the particular operating parameters. A common page size is 4 KB as previously described. An arbitrary page PX at page address PFX is shown in exploded view at 402, which is further subdivided into Z+1 cache lines CL0-CLZ in which Z is any suitable positive integer. In one embodiment with the page size of 4 KB, there may be 64 cache lines (Z=63) in which each cache line includes 64 bytes. It is appreciated, however, that different page and cache line sizes may be used. An access history vector AHV_X 404 is shown corresponding to the page PX 402. The access history vector AHV_X 404 includes one bit for each of the cache lines of the page PX 402. Each bit of the access history vector AHV_X 404 is initially programmed to a logic "0" indicating that it has not yet been accessed.

A couple of cache lines that have been accessed are denoted as "HIT" in response to a load instruction from the processing engine 106. For each cache line that has been accessed and marked with the HIT indication, the corresponding bit within the access history vector AHV_X 404 is set to logic "1" by the update logic 202. It is appreciated that the logic "1's" in an access history vector AHV indicate the caches lines that have been accessed at least once. The total number of logic "1's" indicate that the page has been hit at least that many times, although any one or more of the cache lines may have been accessed more than once. As described further herein, the SRT 204 and the decision logic 208 are used to detect a stride access pattern and corresponding direction.

Figure 5:
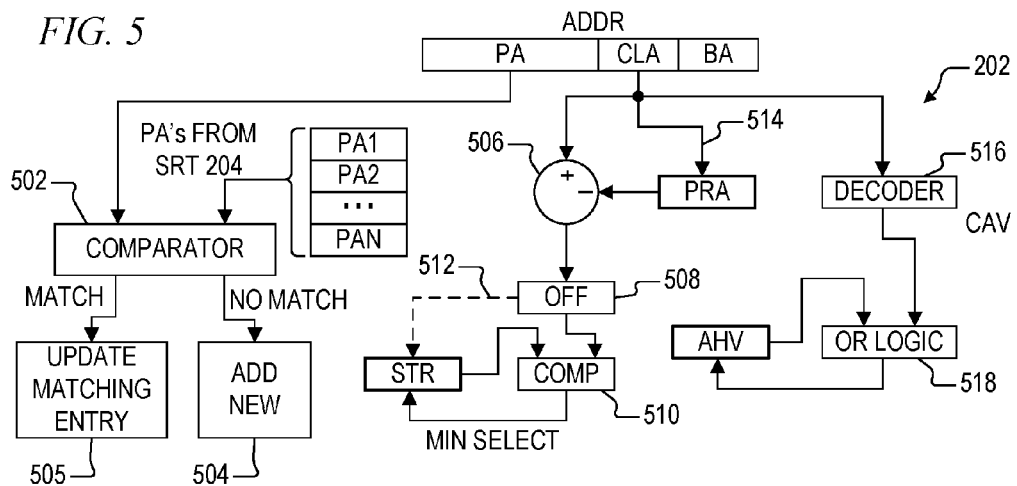
FIG. 5 is a simplified block diagram of the update logic of FIG. 2 according to one embodiment.

FIG. 5 is a simplified block diagram of the update logic 202 according to one embodiment. The full address ADDR of a current load instruction access is shown at top, which may be subdivided into a page address PA, a cache line address CLA, and a byte address BA. The upper bits of the full address identify the page being accessed, the cache line address CLA identifies the cache line being accessed within the identified page, and the byte address BA identifies the particular byte within the identified cache line being addressed or otherwise referenced. The PA is applied to one input of a comparator 502, which compares PA with each of the page values PA1-PAN in the SRT 204. If there are no matching entries, then add/replace logic 504 is invoked to replace an existing entry or otherwise add a new entry into the SRT 204 using the new PA. A new entry is inserted into a blank or otherwise unused entry, or replaces an existing entry according to the applicable replacement policy. Each of the fields in the entry, other than the previous access and access history fields, are set to the predetermined initial values as shown by exemplary entry PA0 previously described. If there is a matching entry, then the stride, previous access and access history fields are updated as described herein by update matching entry logic 505.

When an existing entry is being updated by the update matching entry logic 505, the previous address value, shown as PRA, in the corresponding previous access field is subtracted from CLA by an adder 506, and the difference is an offset value OFF, shown at 508. The OFF value represents the number of cache lines between successive accesses within the page. The current stride value STR stored in the corresponding stride field is compared with OFF by a comparator 510, and the lesser one of the two is selected as the updated STR as indicated by "MIN SELECT". Thus, if OFF is less than STR, then OFF becomes the new stride value STR as indicated by the dashed line 512. If however, STR≤OFF, then STR remains unmodified. It is appreciated that with successive updates, STR becomes the minimum stride value being the minimum difference between multiple successive accesses. For new and updated entries, the CLA from the full address ADDR is stored as the previous access value PRA into the previous access field of the corresponding page entry as shown at 514.

CLA is also provided to a decoder 516 which outputs a current access vector (CAV) identifying the cache line currently being accessed by the load access. The form of the CAV is similar to the current access history value AHV stored in the access history field of the corresponding page entry, in which CAV has all logic "0's" except one logic "1" bit indicating the cache line currently being accessed. The CAV from the decoder 516 is logically OR'd by OR logic 518, in a bit-by-bit manner, and the result is stored back as the updated AHV in the access history field.

Although not shown in FIG. 5, the update logic 202 also updates the POS, NEG and stable fields of the SRT 204. If TRIGGER is asserted, then the update logic 202 increments POS if DIR is a logic "0" or updates NEG if DIR is a logic "1". The update logic 202 updates the SIGN value of the corresponding sign field to reflect the larger one of the POS and NEG values or to reflect the positive direction when POS and NEG are equal. The POS and NEG values are linked to the stride value, so that each time the stride value is updated for a given entry, then the corresponding POS and NEG values are reset back to their initial values (i.e., 0000b). When STABLE is asserted for a given page, then the update logic 202 also set the STABLE bit in the corresponding page entry.

Figure 6:
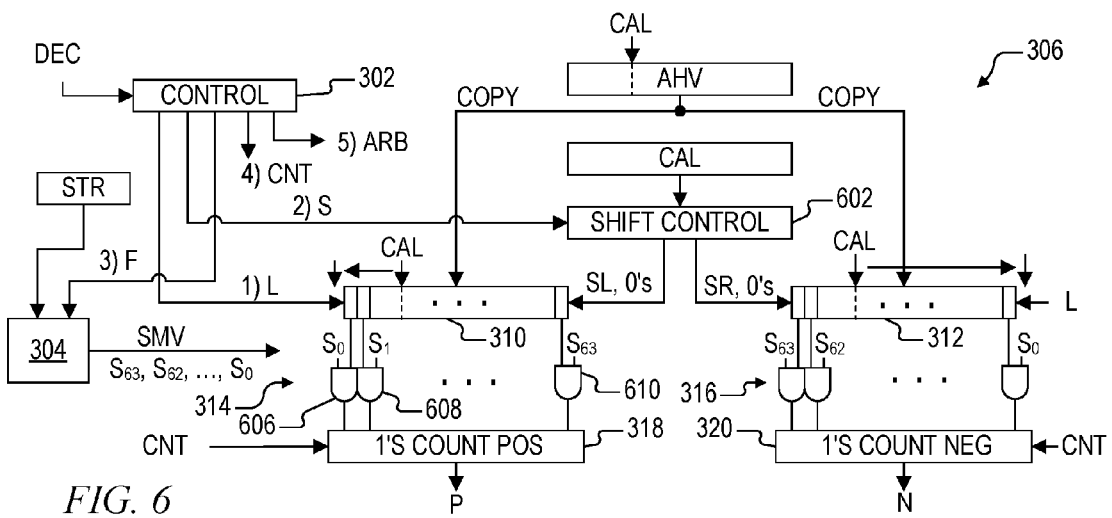
FIG. 6 is a more detailed block diagram of the count logic of FIG. 3 used to determine the count values P and N from the access history vector AHV and the stride mask vector SMV.

FIG. 6 is a more detailed block diagram of the count logic 306 used to determine the count values P and N from the access history vector AHV and the stride mask vector SMV. A current access location identified by CAL is shown identifying a bit within the AHV identifying the cache line currently being accessed. In a first step, the control logic 302 asserts the load indication L to the shift registers 310 and 312. The shift registers 310 and 312 both respond by loading the current value of AHV.

In a second step, the control logic 302 asserts the shift indication S to shift control logic 602, which uses the CAL value from the full address to determine the number of shifts to perform for each of the shift registers 310 and 312. The shift register 310 left-shifts its stored copy of AHV until the bit identified by CAL is shifted out of the left side of the shift register 310. The shift control logic 602 shifts logic "0's" into the right side of the shift register 310 during the shift operation (or else a logic "0" is hardwired on the right). In a similar manner, the shift register 312 right-shifts its stored copy of AHV until the bit identified by CAL is shifted out of the right side of the shift register 312. The shift control logic 602 shifts logic "0's" into the left side of the shift register 312 during the shift operation (or else a logic "0" is hardwired on the left).

It is noted that the shift registers 310 and 312 may be physically coupled in parallel with the access history field so that each bit of the AHV may be loaded into the shift registers in parallel. Once loaded, the shift operation is performed to isolate positive and negative access patterns. Alternatively, the AHV may be shifted into the shift registers 310 and 312 simultaneously or sequentially. In the latter embodiment, the shift control logic 602 may be configured to combine the load and shift operations for each of the shift registers 310 and 312 into one shift operation (collectively or per shift register) to save clock cycles.

In a third step, the control logic 302 asserts the filter indication F to the stride mask logic 304, which retrieves the corresponding stride value STR from the SRT 204 and outputs the corresponding stride mask vector SMV. In one embodiment, the stride mask logic 304 is a lookup table or the like, in which the stride value STR is used as an address to access a corresponding SMV. In an alternative embodiment, the stride mask logic 304 may calculate the SMV or otherwise convert STR using suitable conversion logic or the like.

The AND logic 314 is shown as a series of 2-input AND gates, each having one input receiving a corresponding bit of the shift register 310 and another bit receiving a corresponding bit of the SMV. The SMV is shown as a series of 64 bits $S_{63}, S_{62}, \ldots, S_0$ output from the stride mask logic 304. For the positive count logic, the SMV is reversed, so that bit $S_0$ of SMV is logically AND'ed by a first AND gate 606 with the left-most bit of the shift register 310, and the output is provided to a first input of the positive 1's count logic 318. The next bit $S_i$ of SMV is logically AND'ed by a second AND gate 608 with second bit from the left side of the shift register 310, and the output is provided to a second input of the positive 1's count logic 318. The bit-wise AND operation is repeated for all bits up to the right-most bit of the shift register 310, which is logically AND'ed by another AND gate 610 with the $S_{63}$ of the SMV, and the output is provided to a last input of the positive 1's count logic 318.

The AND logic 316 is configured as a series of 2-input AND gates in a similar manner, except that the SMV is not reversed for the negative count logic. In this case, the bit $S_{63}$ of SMV is logically AND'ed with the left-most bit of the shift register 312, down to bit $S_0$ of SMV being logically AND'ed with the right-most bit of the shift register 312. The results are provided to corresponding inputs of the negative 1's count logic 320.

In a fourth step, the control logic 302 asserts the CNT indication to the count logic 318 and 320. The positive 1's count logic 318 counts the number of logic "1's" as a result of the bit-wise AND operation between the shifted value in the shift register 310 with the reversed SMV to provide the P count. The negative 1's count logic 320 counts the number of logic "1's" as a result of the bit-wise AND operation between the shifted value in the shift register 312 with SMV to provide the N count.

In a fifth step, the control logic 302 asserts the ARB indication to the arbitration logic 308 to determine whether to assert the TRIGGER, DIR and/or STABLE signals.

Figure 7:
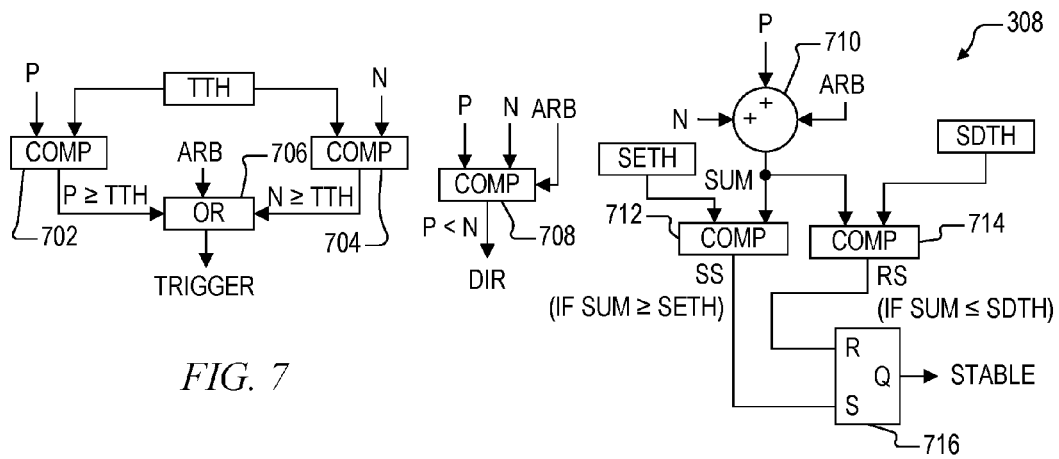
FIG. 7 is a simplified block diagram of the arbitration logic of FIG. 3 according to one embodiment.

FIG. 7 is a simplified block diagram of the arbitration logic 308 according to one embodiment. The P count is provided to one input of a comparator 702 that receives TTH at its other input and that provides a signal indicative of P≥TTH at its output. The N count is provided to one input of a comparator 704 that receives TTH at its other input and that provides a signal indicative of N≥TTH at its output. The outputs of the comparators 702 and 704 are provided to respective inputs of OR logic 706 asserting the TRIGGER signal at its output in response to the ARB indication. In this manner, TRIGGER is asserted if P≥TTH or if N≥TTH.

P and N are also provided to respective inputs of another comparator 708 providing a signal indicative of P<N at its output in response to the ARB indication, in which the output of the comparator 708 may also be the DIR signal. DIR is a logic "0" for the positive direction and logic "1" for the negative direction. Thus, if P<N, then DIR is a logic "1" indicating the negative direction. Otherwise, DIR is a logic "0" indicating the positive direction.

P and N are also provided to respective inputs of an adder 710, which adds P and N to generate a SUM value, or SUM=P+N, in response to the ARB indication. SUM is provided to one input of a comparator 712 receiving SETH at its other input, in which the comparator 712 provides a stable enable signal SS at its output that goes high when SUM≥SETH. SUM is provided to one input of another comparator 714 receiving SDTH at its other input, in which the comparator 714 provides a stable disable signal RS that goes high when SUM≤SDTH. SS is provided to the set (S) input of a set-reset (SR) latch 716, RS is provided to the reset (R) input of the SR latch 716, and the STABLE signal is asserted at the Q output of the RS latch 716. In operation, STABLE is asserted high (to enable stable operation) when P+N≥SETH, and is reset back low when P+N≤SDTH (to disable stable operation).

Figures 8, 9:
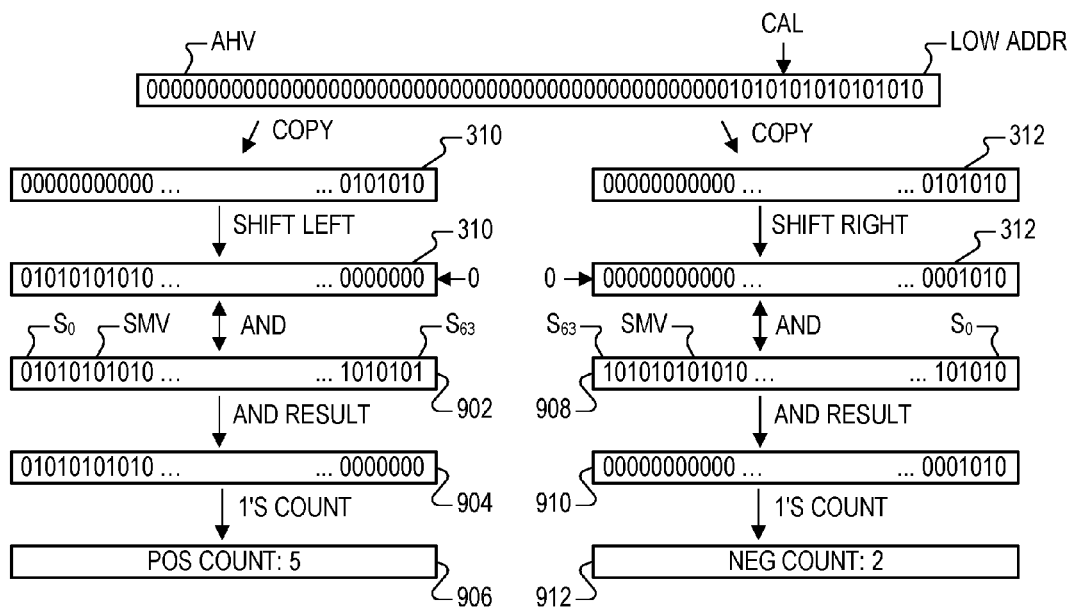
FIG. 8 is a tabular diagram illustrating the stride mask logic of FIG. 3 according to one embodiment.
FIG. 9 is a figurative depiction illustrating operation of the count logic of FIG. 3 according to one embodiment.

FIG. 8 is a tabular diagram illustrating the stride mask logic 304 according to one embodiment. In this case, the stride mask logic 304 may be configured as memory incorporating a lookup table receiving the stride value at its input and providing a corresponding stride mask vector SMV at its output. In the illustrated embodiment, the stride value is a 4-bit number ranging from 1 (0001b) to 15 (1111b) for selecting a corresponding repeating pattern of logic ones and zeroes up to a total of 64 bits. The stride value represents a minimum cache line offset for each of successive memory accesses by the processing engine 106.

When the stride value is 1 (0001b), then the SMV is all ones (111, . . . , 1b) indicating that successive load access each cache line without skipping any cache lines. In an out-of-order processor, the actual load accesses may skip one or more cache lines during operation, but when two successive load access are to adjacent cache lines in a page, then the stride value goes to one (minimum stride) indicating the likelihood that the actual load operation is to each cache line. When the stride value is 2 (0010b), then every other position of the SMV is a logic one, or 10101, . . . , 0b. When the stride value is 3 (0011b), then every third position of the SMV is a logic one, or 1001001, . . . , 0b. This pattern repeats for every successive stride value, so that when the stride value is 15 (1111b), then every 15$^{th}$ position of the SMV is a logic one, or 1000000000000001, . . . , 0b.

FIG. 9 is a figurative depiction illustrating operation of the count logic 306 according to one embodiment. The access history vector AHV is shown at the top with a series of logic ones and zeroes indicating load accesses of the cache lines of a given page. The low address is on the right side of the AHV. As shown, the load accesses are to every other one of the cache lines from the low address and increasing in the positive direction of the page so that the stride value is 2. The current access location, shown as CAL, is shown at the 12$^{th}$ cache line from the right-most position. Although prior load accesses occurred at the 14$^{th}$ and 16$^{th}$ cache lines, this is possible given out-of-order operation. In response to the load indication from the control logic 302, the AHV is copied into the shift registers 310 and 312, shown in abbreviated form. In response to the shift indication from the control logic 302, the bits in the shift register 310 are shifted left, with logic zeros shifted in from the right, until the bit at CAL is shifted out from the left side of the shift register 310. Similarly, the bits in the shift register 312 are shifted right, with logic zeros shifted in from the left, until the bit at CAL is shifted out from the right side of the shift register 312.

As shown at 902, the SMV value for the stride value of 2 is selected, which is SMV=10101, . . . , 0b as shown in FIG. 8, except that it is reversed for the positive direction such that the MSB of $S_{63}$ is at the right-most position. The bit-wise logic AND operation is performed with the result shown at 904. The control logic 302 asserts the count indication CNT, and the positive 1's count logic 318 counts the number of logic "1's" shown at 904, resulting in a positive direction count of 5 shown at 906.

In a similar manner, as shown at 908, the SMV value for the stride value of 2 is selected, which is SMV=10101, . . . , 0b. In this case, the value is not reversed so that the MSB of $S_{63}$ is at the left-most position. The bit-wise logic AND operation is performed with the result shown at 910. The control logic 302 asserts the count indication CNT, and the negative 1's count logic 320 counts the number of logic "1's" shown at 910, resulting in a negative direction count of 2 shown at 912.

FIG. 9 illustrates that the count logic 306 performs two primary functions. The first function is to isolate accesses in the positive and negative directions performed by the shifting operation relative to the current access value CAL. Shifting in a first direction isolates accesses in the positive direction and shifting in the opposite direction isolates accesses in the negative direction. The second function is to filter the shifted access values by SMV which is based on the minimum stride of the multiple accesses. In general, those accesses that do not match the stride pattern according to the minimum stride value are filtered out leaving only those that match the stride access pattern. The resulting isolated and filtered values are then counted to determine whether a stride access pattern is identified, and if so, the corresponding direction of the identified stride pattern.

Referring back to FIG. 7, for P=5 and N=2, of TTH=2, then both P≥TTH and N P≥TTH are true so that the TRIGGER signal is asserted by the OR logic 706. The comparator 708 determines that the direction is positive so that DIR=0b. If SETH is 7, then the SUM value determined by the adder 710 is at least SETH so that the SR latch 716 asserts STABLE high to initiate the stable mode of operation.

FIG. 10 is a diagram of one entry of a given row in the SRT 204 illustrating how the fields are updated for a given series of accesses to the same page. The full ADDR of the first load access is shown in simplified hexadecimal format as "0X4000" which addresses the first cache line of the page identified as corresponding page address "0X4". The initial values in the fields of entry are shown at 1002. Successive accesses to addresses 0X4100 and 0X4080 of the same page 0X4 are shown at 1004 and 1006, respectively. The previous access field for the initial entry 1002 is shown as 000000b since accessing the first page, and the access history field is shown with its right-most bit set to logic "1" indicating that the first cache line of the page was accessed. The second load access shown at 1004 is to the fifth cache line at a cache line offset of 4, so that the previous access field is updated to 000100b, the access history field is updated to 0, . . . , 0010001b, and the stride value is updated to 0100b (offset of 4). The third load access shown at 1006 is to the third cache line at a cache line offset of 2, so that the previous access field is updated to 000010b, the access history field is updated to 0,..., 0010101b, and the stride value is updated to 0010b (offset of 2). It is noted that TRIGGER may be updated with DIR asserted as 0b indicating the positive direction. The POS and NEG fields remain at 0000b each since reset with each change of the stride field. Assuming that the stride value is actually 2, then successive accesses continue to update the fields in similar manner, and POS is incremented to indicate the positive direction. Once a sufficient number of successive load accesses are detected with the same stride, the STABLE signal is asserted.

FIG. 11 is a flowchart diagram illustrating operation of the update logic 202 according to one embodiment. The update logic 202 detects an instruction from the processing engine 106 at first block 1102, and queries whether the instruction is a load instruction accessing a memory location at next block 1104. If not, operation loops back to block 1102 and operation remains looping between blocks 1102 and 1104 until a load instruction is detected. In an actual implementation, one or more bits of each instruction are evaluated for detecting load instructions. When a load instruction is detected, operation proceeds to block 1106 in which the SRT 204 is accessed using a page address PA retrieved from the address ADDR of the load instruction. As shown in FIG. 5, PA includes the upper bits of ADDR identifying the page being accessed, and the comparator 502 compares the provided PA with each of the page addresses in the SRT 204. If a matching entry for PA is not found, then the load instruction is accessing a new page as determined at next block 1108. If no matching entry is found, then operation advances to block 1110 in which a new entry is added into the SRT 204 as previously described with respect to the add/replace logic 504, and operation returns back to block 1102 for detecting any subsequent load instructions. The fields of the new entry are filled with initial values as shown by entry with page address PA0 shown in FIG. 3.

If instead a match is found as determined at block 1108, then operation proceeds instead to block 1112 to update the matching entry. As shown in FIG. 5, the cache line address CLA portion of the address ADDR is compared with the current previous access value PRA of the matching entry to determine a cache line offset OFF between the current access and the last access to the page. If OFF is less than the current stride value STR for the matching entry, then the stride value is updated with OFF as shown by dashed line 512. Otherwise, the STR value of the entry remains unmodified. The CLA of ADDR is then used to replace the PRA value of the previous access field as shown at 514. Also, the access history vector AHV is updated by setting the bit associated with the cache line currently being accessed.

Once the entry is updated at block 1112, operation proceeds to block 1114 in which the update logic 202 asserts DEC to the decision logic 208 to make a count and further to make a decision as to whether to assert TRIGGER to perform a prefetch operation. Also, the load signal LD and the ADDR are provided to the prefetcher 210. The prefetcher 210 uses ADDR to calculate one or more prefetch addresses depending upon the mode of operation and whether TRIGGER is asserted. At next block 1116, the update logic 202 detects whether TRIGGER is asserted, and if so, updates the POS, NEG and SIGN fields of the matching entry. In particular, the DIR value is evaluated and either POS or NEG is incremented, and the SIGN value of the matching entry may be updated based on the updated POS and NEG values. At next block 1118, if the STABLE signal is detected asserted by the decision logic 208 indicating the stable mode of operation, then the update logic 202 sets the stable field of the matching entry. Operation then returns back to block 1102 to detect any subsequent load instructions.

FIG. 12 is a flowchart diagram illustrating operation of the control logic 302 of the decision logic 208 according to one embodiment. Reference is made to the logic operations shown in FIG. 6. Operation loops at block 1202 until the decision signal DEC is detected asserted by the update logic 202. When DEC is asserted, operation proceeds to block 1204 in which the control logic 302 asserts the L indication to load the shift registers 310 and 312 with the AHV of the entry corresponding with the page address PA. At next block 1206, the control logic 302 asserts the S indication to cause the shift registers 310 and 312 to each shift the loaded value of AHV left and right, respectively, based on the current access location CAL. Operation then proceeds to block 1208 in which the control logic 302 asserts the F indication to the stride mask logic 304 to select an SMV based on the corresponding stride value. The SMV is provided to the positive and negative logic AND logic 314 and 316 to effectively filter the shifted history values to provide filtered values to the positive and negative 1's count logic 318 and 320, respectively. Operation then proceeds to block 1210 in which the control logic 302 asserts the CNT indication to the positive and negative 1's count logic 318 and 320 to generate the positive and negative count values P and N, respectively, which are provided to the arbitration logic 308. Operation then proceeds to block 1212 in which the control logic 302 asserts the ARB indication to the arbitration logic 308 to evaluate P and N for making the prefetch decision as previously described. Operation then loops back to block 1202 for detecting any subsequent assertions of DEC, and operation repeats.

FIG. 13 is a flowchart diagram illustrating operation of the arbitration logic 308 of the decision logic 208 according to one embodiment. Reference is made to the logic operations shown in FIG. 7. Operation loops at block 1302 until the ARB indication is detected by the control logic 302. When ARB is provided, operation proceeds to block 1304 in which the TRIGGER signal is asserted if either one of the positive and negative counts P and N is at least TTH. At block 1306, DIR is asserted to logic "1" when the negative count N is greater than the positive count P, and otherwise DIR is logic "0". At next block 1308, the STABLE signal is asserted if the sum of P and N is at least SETH. At next block 1310, the STABLE signal is negated if the sum of P and N has fallen back to SDTH or less. Operation returns to block 1302 to detect the next ARB indication, and operation repeats.

Figure 14:
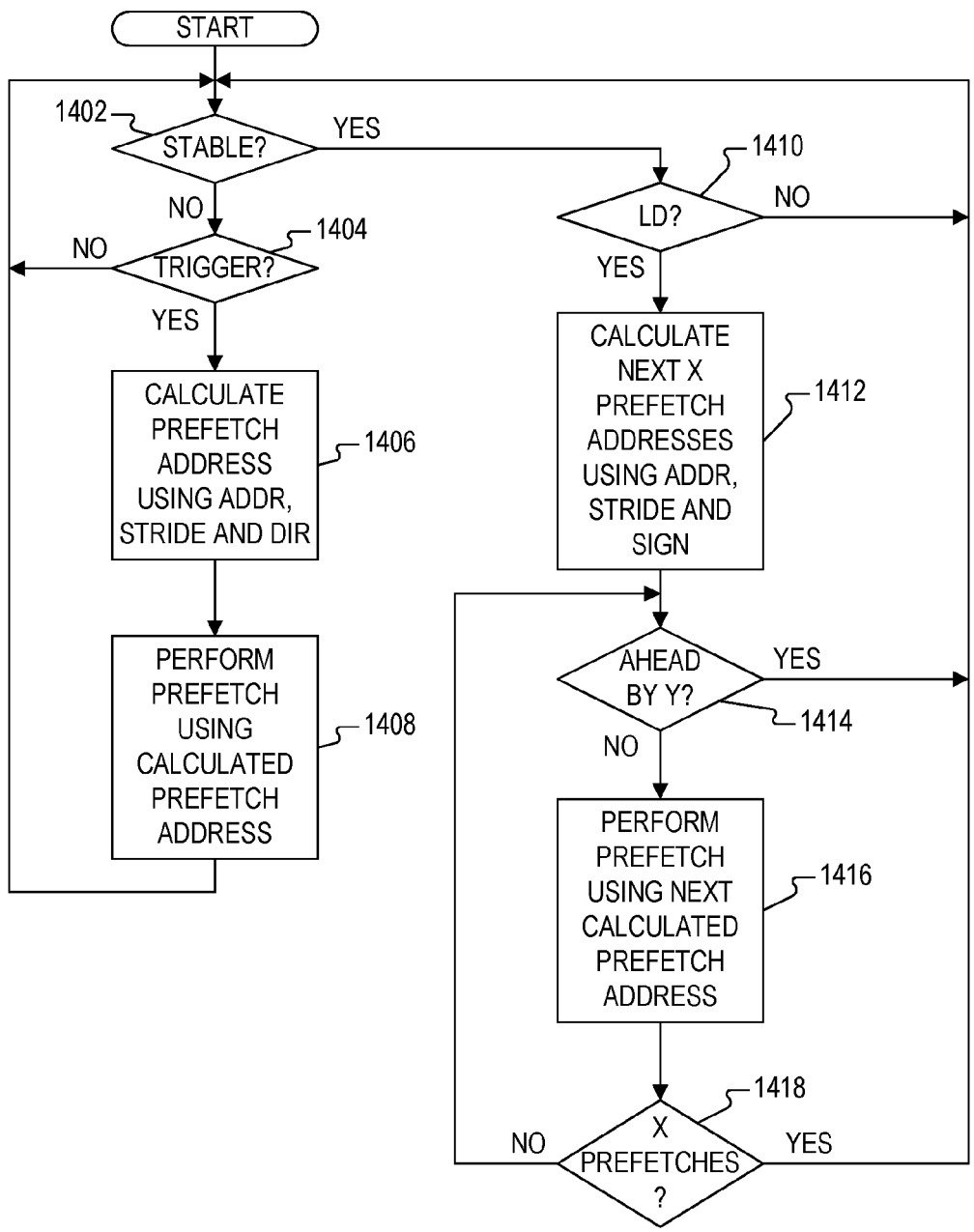
FIG. 14 is a flowchart diagram illustrating operation of the prefetcher of FIG. 2 according to one embodiment.

FIG. 14 is a flowchart diagram illustrating operation of the prefetcher 210 according to one embodiment. At first block 1402, it is queried whether the STABLE signal is asserted. If not, operation proceeds to block 1404 to query whether the TRIGGER signal has been asserted. If not, operation loops back to block 1402, and operation loops between blocks 1402 and 1404 while STABLE and TRIGGER are not asserted. If TRIGGER is asserted while STABLE is not, then operation proceeds to block 1406 in which a prefetch address is calculated using the ADDR, STRIDE and DIR values. The DIR value determines whether STRIDE is added to or subtracted from ADDR for determining the prefetch address. At next block 1408, the prefetcher 210 performs the prefetch operation using the calculated prefetch address by loading a cache line from the system memory 104 into the cache memory 108. In this manner, a cache line address that has not yet been requested by the processing engine 106, but that is likely to be requested according to a detected stride pattern, is preloaded into the cache memory 108. If and when requested by the processing engine 106, the preloaded cache line is more quickly retrieved from the cache memory 108 as compared to the system memory 104. Operation then loops back to block 1402. Each time TRIGGER is asserted while STABLE is not, a cache line from the system memory 104 is prefetched into the cache memory 108 to improve performance.

If STABLE is asserted as detected at block 1402, then operation proceeds instead to block 1410 to query whether the LD signal is asserted. Even though STABLE is asserted, prefetches during the stable operation are only performed in response to load requests by the processing engine 106. If LD is not asserted, operation loops back to block 1402 and operation loops between 1402 and 1410 until LD is asserted or STABLE is not asserted. It is noted that the first time STABLE is asserted, LD is also likely to be asserted. When LD is asserted as detected at block 1410, operation proceeds to block 1412 in which the next "X" prefetch addresses are calculated using ADDR, STRIDE and SIGN. SIGN indicates the direction of the stride operation, so that STRIDE is either added to or subtracted from ADDR X times to determine the next X prefetch addresses. The number "X" is a positive integer and may be a default value or may be programmable in a similar manner as the TTH, SETH and SDTH values.

In one embodiment, X has a default value of 3. Assuming SIGN indicates a positive direction and X=3, for example, then STRIDE is added to ADDR to determine a first prefetch address, STRIDE is added to the first prefetch address to determine a second prefetch address, and then STRIDE is added to the second prefetch address to determine a third prefetch address. Of course, STRIDE is subtracted X times in similar manner X times to determine X prefetch addresses in the negative direction of SIGN indicates a negative direction.

Once the prefetch addresses are calculated, operation proceeds to block 1414 to query whether prefetches are ahead of actual load requests by the processing engine 106 by "Y" times. The number "Y" is a positive integer that is greater than X and may be a default value or may be programmable in a similar manner as the TTH, SETH and SDTH values. In one embodiment, Y is related to X by a suitable multiple, such as Y=2X. It is understood that stable operation can be aggressive and it may not be advantageous to allow prefetch operation to get too far ahead of actual load requests submitted by the processing engine 106. In this manner, the Y value comparison provides a mechanism that prevents prefetch operation from getting too far ahead. Of course, Y may be adjusted depending upon the particular implementation, and may be made large if desired. If the prefetch during the stable mode of operation is ahead by Y prefetches or more, then operation returns back to block 1402, and operation loops during the stable mode of operation until LD is asserted again. Operation loops back from block 1414 until prefetch operation is not ahead by Y or more prefetch operations.

If prefetch operation during the stable mode is not ahead by Y as determined at block 1414, then operation proceeds to block 1416 in which a prefetch operation is performed using the next calculated prefetch address. Operation then proceeds to block 1418 to determine whether the X prefetches using the X calculated prefetch addresses have been performed. If not, operation loops back to block 1414 to perform up to X prefetches as long as not ahead by Y. Operation loops between blocks 1414, 1416 and 1418 until the X prefetch operations or until ahead by Y. Once the X prefetches are completed, operation returns back to block 1402 and operation repeats. During the stable mode of operation, up to X cache line address that have not yet been requested by the processing engine 106, but that are likely to be requested according to a detected stride pattern that is deemed stable, are preloaded into the cache memory 108. If and when requested by the processing engine 106, the preloaded cache lines are more quickly retrieved from the cache memory 108 rather than having to access the system memory 104. During the stable mode of operation, multiple cache lines from the system memory 104 are prefetched into the cache memory 108 to significantly improve performance.

The foregoing description has been presented to enable one of ordinary skill in the art to make and use the present invention as provided within the context of a particular application and its requirements. Although the present invention has been described in considerable detail with reference to certain preferred versions thereof, other versions and variations are possible and contemplated. Various modifications to the preferred embodiments will be apparent to one skilled in the art, and the general principles defined herein may be applied to other embodiments. For example, the circuits described herein may be implemented in any suitable manner including logic devices or circuitry or the like.

Those skilled in the art should appreciate that they can readily use the disclosed conception and specific embodiments as a basis for designing or modifying other structures for carrying out the same purposes of the present invention without departing from the spirit and scope of the invention. Therefore, the present invention is not intended to be limited to the particular embodiments shown and described herein, but is to be accorded the widest scope consistent with the principles and novel features herein disclosed.

What is claimed is:

1. A stride reference prefetcher for a processor, comprising:
   access logic that detects successive load requests to cache lines of a page of memory, that determines a stride value between each of said successive load requests and that determines a minimum stride value, and that updates an access history vector which identifies each cache line of said page of memory that has been accessed;
   a stride mask logic that provides a stride mask vector based on said minimum stride value;
   count logic that filters said access history vector with said stride mask vector to determine a positive access count and a negative access count;
   arbitration logic that triggers a prefetch operation when either one of said positive access count and said negative access count meets a trigger threshold and that indicates a direction of memory accesses based on a relative size of said positive access count and said negative access count; and
   a prefetcher that performs said prefetch operation using a prefetch address when triggered by said arbitration logic, wherein said prefetcher determines said prefetch address by combining a load request address and said minimum stride value in a direction indicated by said arbitration logic.

2. The stride reference prefetcher of claim 1, wherein said access logic comprises a reference table that stores a page address of said page, that stores said minimum stride value, that stores a previous access value that identifies a cache line accessed by said load request address, and that stores said access history vector.

3. The stride reference prefetcher of claim 2, wherein said access logic further comprises:
   an adder that determines a difference between a next access value and said previous access value to determine a next stride value;
   a comparator that compares said minimum stride value with said next stride value and that replaces said minimum stride value with said next stride value as an updated minimum stride value in said reference table when said next stride value is less than said minimum stride value; and
   wherein said previous access value is replaced by said next access value as an updated previous access value in said reference table.

4. The stride reference prefetcher of claim 2, wherein said access logic further comprises:

a decoder that decodes a next access value of said load request address to provide a decoded access value that identifies a next cache line being accessed; and OR logic that logically OR's said decoded access value with said access history vector to update said access history vector.

5. The stride reference prefetcher of claim 1, wherein said access logic comprises a reference table comprising a column of page address entries, a column of corresponding minimum stride value entries, a column of corresponding previous access values that identify a cache line last accessed for a corresponding page address, and a column of corresponding access history vectors.

6. The stride reference prefetcher of claim 5, wherein said access logic further comprises:

a comparator that compares a next page address with each valid page address stored in said column of page address entries of said reference table;

update logic that updates a row of entries corresponding to a page address that matched said next page address; and replace logic that adds a new row of entries into said reference table when said next page address does not match any valid page addresses stored in said column of page address entries of said reference table.

7. The stride reference prefetcher of claim 6, wherein said replace logic uses a least-recently used replacement policy to replace a valid row of entries in said reference table including said next page address and corresponding initial values.

8. The stride reference prefetcher of claim 1, wherein said arbitration logic comprises:

a first comparator that compares said positive access count with said trigger threshold and that asserts a first value indicative thereof;

a second comparator that compares said negative access count with said trigger threshold and that asserts a second value indicative thereof; and OR logic that logically OR's said first and second values to provide a trigger signal that triggers said prefetch operation.

9. The stride reference prefetcher of claim 8, wherein said arbitration logic further comprises a third comparator that compares said positive access count with said negative access count and that provides a direction signal, wherein said direction signal indicates a negative direction of memory accesses when said positive access count is less than said negative access count, and otherwise indicates a positive direction of memory accesses.

10. The stride reference prefetcher of claim 1, wherein:

said arbitration logic asserts a trigger signal to trigger a prefetch operation and asserts a direction signal indicating said direction of said prefetch operation;

wherein said access logic increments only one of a positive value and a negative value with each assertion of said direction signal, and determines a sign value based on a larger one of said positive value and said negative value;

wherein said arbitration logic comprises:

an adder that adds said positive access count and said negative access count to provide an access sum; and a comparator circuit that compares said access sum to a stable enable threshold and that asserts a stable enable signal when said stable threshold is met; and wherein said prefetcher performs a plurality of sequential prefetch operations using a corresponding plurality of sequential prefetch addresses in response to assertion of said stable enable signal, wherein said plurality of sequential prefetch addresses is determined by repeatedly combining a multiple of said minimum stride value to said load request address in a direction indicated by said sign value.

11. The stride reference prefetcher of claim 10, wherein said comparator circuit comprises:

a first comparator that compares said access sum with said stable enable threshold and that asserts a stable enable signal when said stable enable threshold is met;

a second comparator that compares said access sum with a stable disable threshold and that asserts a stable disable signal when said stable disable threshold is met; and a latch circuit that receives said stable enable and disable signals and that asserts a stable signal indicative of a stable mode of operation.

12. The stride reference prefetcher of claim 10, wherein said access logic comprises a reference table that stores a page address of said page, a stable value, said minimum stride value, said sign value, said positive value, said negative value, a previous access value that identifies a cache line accessed by said load request address, and said access history vector.

13. The stride reference prefetcher of claim 12, wherein said access logic further comprises update logic that toggles said stable value when said stable enable signal is asserted, that increments one of said positive value and said negative value in response to assertion of said direction signal, that updates said sign value to reflect only one of said positive value and said negative value.

14. The stride reference prefetcher of claim 10, wherein said plurality of sequential prefetch operations is limited by said prefetcher to stay ahead of said successive load requests by no more than a predetermined maximum number.

15. A processor, comprising:

a cache memory;

processing logic that submits a plurality of load requests to access cache lines of a memory page;

access logic that receives said plurality of load requests by said processing logic and that updates an access vector for said memory page, wherein said access logic determines a minimum stride value between successive ones of said plurality of load requests;

stride mask logic that provides a mask vector based on said minimum stride value;

count logic that combines said mask vector with said access vector to provide an access count;

arbitration logic that triggers a prefetch operation when said access count achieves a predetermined count threshold; and a prefetcher that performs said prefetch operation using a prefetch address determined by combining said minimum stride value with an address of a last one of said plurality of load requests.

16. The processor of claim 15, wherein said access logic comprises:

a reference table that stores a previous access value identifying a first cache line within said memory page and that stores said minimum stride value;

an adder that determines a difference between said previous access value and a next access value identifying a second cache line within said memory page and to determine a stride offset;

a comparator that compares a current minimum stride value with said stride offset to update said minimum stride value; and wherein said next access value replaces said previous access value in said reference table for each of said plurality of load requests.

17. The processor of claim 15, wherein said access vector comprises a plurality of bits identifying load request accesses of a corresponding plurality of cache lines of said memory page.

18. The processor of claim 15, wherein said stride mask logic comprises a lookup table that provides one of a plurality of mask vectors for each of a plurality of possible stride values.

19. The processor of claim 15, wherein said count logic comprises:
a first shift register that shifts said access count in a first direction by an amount based on a relative location of said last one of said plurality of load requests to provide a positive access history value;
a second shift register that shifts said access count in a second and opposite direction by an amount based on said relative location of said last one of said plurality of load requests to provide a negative access history value;
AND logic that logically AND's said mask vector with said positive access history value and said negative access history value; and
count logic that counts outputs of said AND logic to provide a positive access count and a negative access count.

20. The processor of claim 15, wherein:
said count logic determines a positive access count and a negative access count; and
wherein said arbitration logic comprises:
a first comparator that compares said positive access count with said predetermined count threshold and that asserts a first value indicative thereof;
a second comparator that compares said negative access count with said predetermined count threshold and that asserts a second value indicative thereof;
OR logic that logically OR's said first and second values to provide a trigger signal indicative of triggering said prefetch operation; and
a third comparator that compares said positive access count with said negative access count and that provides a direction signal indicative of one of a positive direction and a negative direction.

21. The processor of claim 15, wherein:
said count logic determines positive and negative access vector values, combines said mask vector with each of said positive and negative access vector values and provides positive and negative access counts;
wherein said arbitration logic determines a direction of said prefetch operation based on said positive and negative access counts;
wherein said arbitration logic indicates a stable condition of said load requests based on said positive and negative access counts; and
wherein said prefetcher performs successive prefetch operations using successive prefetch addresses by combining a multiple of said minimum stride value with said address of a last load request when said stable condition is indicated.

22. The processor of claim 21, wherein said arbitration logic comprises:
an adder that adds said positive access count and said negative access count to provide an access sum;
a first comparator that compares said access sum with a stable enable threshold and that asserts a stable enable signal when said stable enable threshold is met;
a second comparator that compares said access sum with a stable disable threshold and that asserts a stable disable signal when said stable disable threshold is met; and
a latch circuit that receives said stable enable and disable signals and that asserts a stable signal indicative of a stable mode of operation.

23. A method of prefetching data from a memory into a processor, combining:
detecting successive load requests to cache lines of a page of memory;
determining a stride value between each of the successive load requests;
determining a minimum stride value;
updating an access history vector that identifies each cache line of the page of memory that has been accessed;
determining a stride mask vector based on the minimum stride value;
filtering the access history vector with the stride mask vector and determining an access count; and
performing a prefetch operation when the access count achieves a predetermined count threshold.

24. The method of claim 23, wherein said determining a stride value comprises:
updating a stored previous access value for each successive load request; and
comparing a next access value with the stored previous access value.

25. The method of claim 23, wherein said determining a minimum stride value comprises:
determining a stride value for each successive load request;
comparing a next stride value with a currently stored minimum stride value; and
updating the minimum stride value with the next stride value if the next stride value is less than the currently stored minimum stride value.

26. The method of claim 23, wherein said updating an access history vector comprises setting a bit that corresponds with a currently accessed cache line of the page of memory.

27. The method of claim 23, wherein said determining a stride mask vector comprises selecting one of a plurality of stride mask vectors, each corresponding with a corresponding one of a plurality of possible stride values.

28. The method of claim 23, further comprising:
shifting the access history vector in a first direction to provide a positive access history vector;
shifting the access history vector in a second, opposite direction to provide a negative access history vector;
wherein said filtering comprises filtering the positive access history vector with the stride mask vector to provide a positive count, and filtering the negative access history vector with the stride mask vector to provide a negative count;
wherein said performing a prefetch operation comprises performing the prefetch operation when either one of the positive and negative counts achieves the predetermined count threshold; and
determining a direction of the prefetch operation based on comparing the positive and negative counts.

29. The method of claim 28, further comprising:
adding the positive and negative counts to determine a sum count;

comparing the sum count with a stable enable threshold; and operating in a stable mode when the sum count reaches the stable enable threshold.

30. The method of claim 29, wherein said operating in a stable mode comprises repeatedly adding the minimum stride value to determine successive prefetch addresses and performing a prefetch operation for each of the successive prefetch addresses.

31. The method of claim 29, further comprising:

comparing the sum count with a stable disable threshold; and terminating said operating in a stable mode when the sum count falls to the stable disable threshold.

\* \* \* \* \*